United States Patent
Cha et al.

(10) Patent No.: US 8,976,693 B2
(45) Date of Patent: Mar. 10, 2015

(54) METHOD FOR REPORTING EMERGENCY AND TERMINAL IN MOBILE COMMUNICATION SYSTEM

(75) Inventors: Jae Sun Cha, Daejeon (KR); Soojung Jung, Daejeon (KR); Seokki Kim, Osan-si (KR); Chul Sik Yoon, Seoul (KR); Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 105 days.

(21) Appl. No.: 13/548,754

(22) Filed: Jul. 13, 2012

(65) Prior Publication Data
US 2013/0016675 A1    Jan. 17, 2013

(30) Foreign Application Priority Data

Jul. 15, 2011  (KR) .................. 10-2011-0070162
Jul. 10, 2012  (KR) .................. 10-2012-0075225

(51) Int. Cl.
| H04W 4/00 | (2009.01) |
| H04W 76/00 | (2009.01) |
| H04W 4/22 | (2009.01) |
| H04W 4/20 | (2009.01) |
| H04W 72/04 | (2009.01) |

(52) U.S. Cl.
CPC ........ *H04W 76/007* (2013.01); *H04W 72/0406* (2013.01); *H04W 72/0413* (2013.01); *H04W 72/04* (2013.01); *H04W 72/042* (2013.01); *H04W 4/005* (2013.01); *H04W 4/22* (2013.01); *H04W 4/20* (2013.01)
USPC ............................ 370/252; 370/328; 370/329

(58) Field of Classification Search
CPC ............ H04W 72/04; H04W 72/0406; H04W 72/0413; H04W 42/042; H04W 74/002; H04W 74/004; H04W 74/006
USPC .......................................... 370/252, 328, 329
See application file for complete search history.

(56) References Cited

U.S. PATENT DOCUMENTS

| 6,337,641 | B1 * | 1/2002 | Yoshioka et al. ............. 340/989 |
| 8,036,720 | B1 * | 10/2011 | Conrad et al. ................ 455/574 |
| 2004/0232277 | A1 * | 11/2004 | Gehlot et al. ................ 244/3.19 |
| 2009/0280770 | A1 | 11/2009 | Mahendran |
| 2010/0118741 | A1 | 5/2010 | Youn et al. |
| 2010/0144279 | A1 * | 6/2010 | Vasenkari et al. ........... 455/63.1 |
| 2010/0172288 | A1 * | 7/2010 | Vachhani ...................... 370/328 |
| 2011/0128955 | A1 * | 6/2011 | Constantinof ................ 370/352 |
| 2012/0064854 | A1 * | 3/2012 | Youn et al. ................. 455/404.1 |
| 2013/0188607 | A1 * | 7/2013 | Mutikainen ................... 370/331 |
| 2014/0057588 | A1 * | 2/2014 | Ostrup et al. .............. 455/404.1 |

FOREIGN PATENT DOCUMENTS

| KR | 1020070054541 | 5/2007 |
| KR | 1020080095605 | 10/2008 |

OTHER PUBLICATIONS

Agiwal, Anil et al., "Abnormal Power Down Indication," IEEE 802.16 Broadband Wireless Access Working Group, retrieved online at http://ieee802.org/16, 5 pages (2011).

* cited by examiner

*Primary Examiner* — Farah Faroul
(74) *Attorney, Agent, or Firm* — Nelson Mullins Riley & Scarborough LLP

(57) ABSTRACT

Disclosed is a method for a terminal to report an emergency in a mobile communication system, the method including detecting an emergency and transmitting an emergency report header to a base station to notify the base station of the emergency, the emergency report header including a field indicating a signaling header for emergency reporting.

15 Claims, 5 Drawing Sheets

METHOD FOR REPORTING EMERGENCY AND TERMINAL IN MOBILE COMMUNICATION SYSTEM

CROSS-REFERENCE TO RELATED APPLICATION

This application claims priority to and the benefit of Korean Patent Application Nos. 10-2011-0070162 and 10-2012-0075225 filed in the Korean Intellectual Property Office on Jul. 15, 2011 and Jul. 10, 2012, respectively, the entire contents of which are incorporated herein by reference.

BACKGROUND OF THE INVENTION (a) Field of the Invention

The present invention relates to a mobile communication system. More particularly, the present invention relates to a method for reporting an emergency in a mobile communication system and a terminal supporting the same.

(b) Description of the Related Art

A wideband mobile communication system is used for high-speed data communication or voice communication through a computer or terminal that is controlled by a user. In recent years, there has been an increasing market demand for M2M (machine to machine) communication which occurs without user intervention. Therefore, ongoing efforts are being made to support Machine to Machine communication (hereinafter also referred to as "M2M communication") by making changes to the existing wideband mobile communication system.

In the event of an emergency (e.g., a power outage) in M2M communication, a terminal has to undergo a complicated procedure to transmit an emergency report message to a base station.

Hence, in the event of a sudden emergency, the terminal may not be successful in transmitting an emergency report message to the base station according to how much electrical power is left in the terminal.

Accordingly, there is a need to simplify the procedure of reporting an emergency for quick reporting.

SUMMARY OF THE INVENTION

The present invention has been made in an effort to provide a method for reporting an emergency and a terminal supporting the same.

An exemplary embodiment of the present invention provides a method for a terminal to report an emergency in a mobile communication system, the method including: detecting an emergency; and transmitting an emergency report header to a base station to notify the base station of the emergency, the emergency report header including a field indicating a signaling header for emergency reporting.

Another embodiment of the present invention provides a terminal including an RF (radio frequency) unit and a processor, the processor being configured to detect an emergency and transmit an emergency report header to a base station to notify the base station of the emergency, the emergency report header including a field that indicates a signaling header for emergency reporting.

DETAILED DESCRIPTION OF THE EMBODIMENTS

Figure 1:
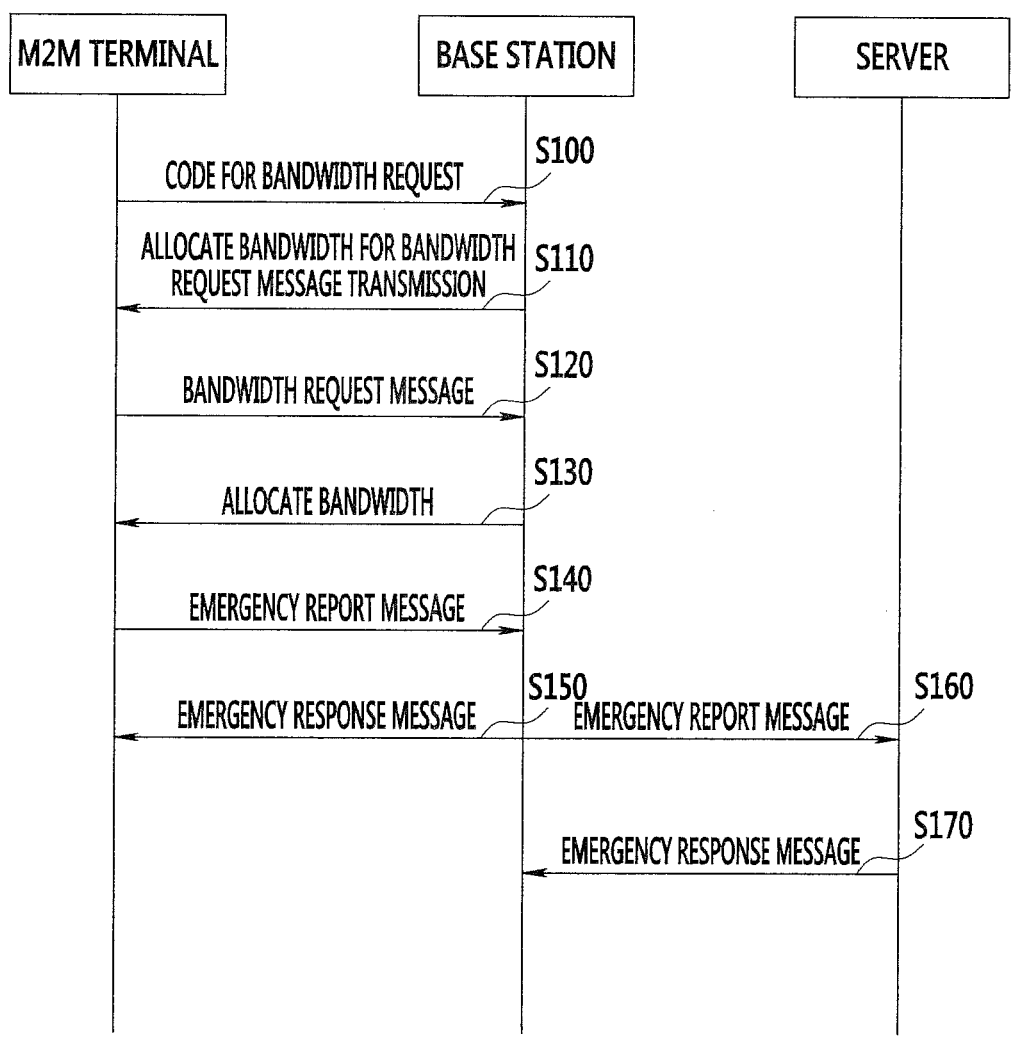
FIG. 1 shows a procedure of reporting in the event of an emergency such as a power outage.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a terminal may designate a terminal, a mobile terminal (MT), a mobile station (MS), a subscriber station (SS), a portable subscriber station (PSS), an access terminal (AT), user equipment (UE), etc., and may include the entire or partial functions of the terminal, the MT, the MS, the SS, the PSS, the AT, the UE, etc.

In this specification, a base station (BS) may designate a nodeB, an evolved nodeB (eNodeB), an access point (AP), a radio access station (RAS), a base transceiver station (BTS), a mobile multihop relay (MMR-BS), etc., and may include the entire or partial functions of the nodeB, the eNodeB, the AP, the RAS, the BTS, the MMR-BS, etc.

In this specification, an M2M terminal indicates a terminal participating in M2M (machine to machine) communication which occurs without user intervention.

An example of use of M2M communication is a smart grid system. In the smart grid system, a meter for measuring the amount of electrical energy in a household, a device installed in a home appliance to control electricity use, and the like are some examples of the M2M terminal. In the smart grid system, the amount of electricity use or the type of electricity use collected by the M2M terminal is directly correlated with electric utility rates. Therefore, it is necessary to deliver such information accurately. Moreover, in the event of a sudden emergency such as a power outage, the server needs to be quickly notified.

FIG. 1 shows a procedure of reporting in the event of an emergency such as a power outage.

Referring to FIG. 1, in the event of an emergency, an M2M terminal transmits a ranging code for an uplink bandwidth request to a base station (S100). Having received the ranging code, the base station allocates an uplink bandwidth for transmitting a bandwidth request message (S110).

The M2M terminal transmits a bandwidth request message to the base station by using uplink bandwidth allocated from the base station (S120). Having received the bandwidth request message, the base station allocates an uplink bandwidth to the M2M terminal (S130). The base station may allocate as wide an uplink bandwidth as specified in the bandwidth request message.

The M2M terminal transmits an emergency report message to the base station by using the uplink bandwidth allocated from the base station (S140).

In response to this message, the base station transmits an emergency response message to the M2M terminal (S150), forwards the emergency report message to a server (S160), and receives an emergency response message from the server (S170).

In the event of an emergency (e.g., a sudden power outage), the remaining electrical power may differ according to the type of terminal. If there is almost no electrical power left in the terminal, the terminal cannot complete the procedure of FIG. 1. Therefore, in order for various kinds of terminals to successfully transmit an emergency report message, it is required to reduce the procedure of transmitting an emergency report message as much as possible to enable quick reporting.

Moreover, it is necessary to distinguish between a bandwidth request message for transmitting general uplink data and a bandwidth request message for reporting an emergency, so that an uplink bandwidth for an emergency report message is allocated first.

Figure 2:
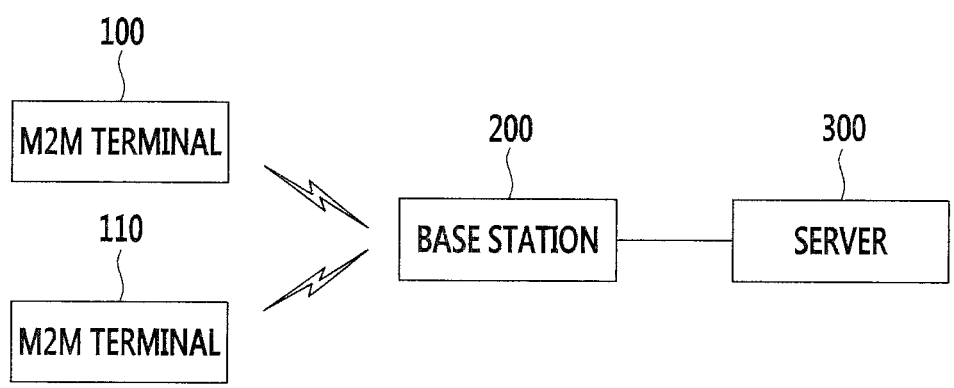
FIG. 2 shows a network environment that supports an emergency report procedure of an M2M terminal according to an exemplary embodiment of the present invention.

FIG. 2 shows a network environment that supports an emergency report procedure of an M2M terminal according to an exemplary embodiment of the present invention.

Referring to FIG. 2, the network environment for supporting the emergency report procedure of the M2M terminal includes at least one M2M terminal 100 or 110, at least one base station 200, and a server 300.

The M2M terminal 100 and 110 and the base station 200 may be connected through a wireless interface.

The server 300 may be a server of a system that manages electrical power.

Figure 3:
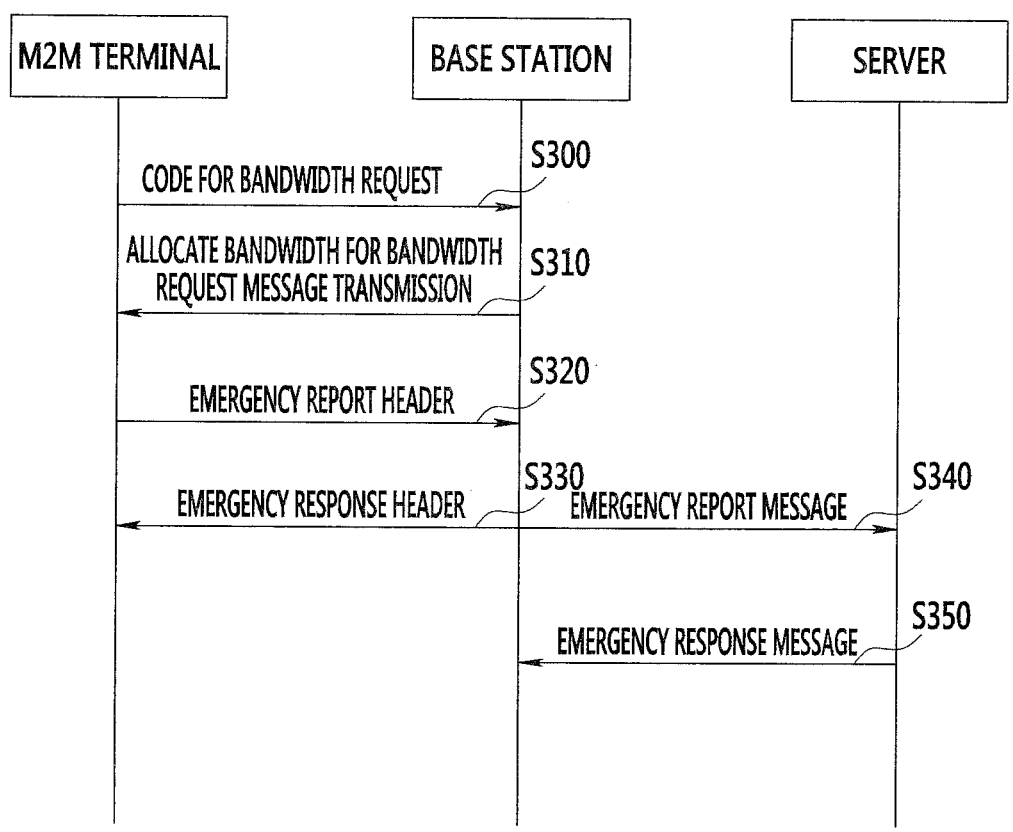
FIG. 3 shows an emergency report procedure of an M2M terminal according to an exemplary embodiment of the present invention.

FIG. 3 shows an emergency report procedure of an M2M terminal according to an exemplary embodiment of the present invention.

Referring to FIG. 3, in the event of an emergency, an M2M terminal transmits a ranging code for an uplink bandwidth request to a base station (S300). Having received the ranging code, the base station allocates an uplink bandwidth for transmitting a bandwidth request message (S310). The uplink bandwidth for the bandwidth request message transmission is equal to the size (e.g., 6 bytes) of a typical bandwidth request message.

The M2M terminal transmits an emergency report header by using the uplink bandwidth for bandwidth request message transmission, allocated from the base station (S320). The emergency report header may be one of MAC signaling headers. For example, the emergency report header may be an abnormal power down report header. The emergency report header has the same structure as a typical bandwidth request message, and its size may be smaller or larger than the size of the typical bandwidth request message.

Having received the emergency report header from the M2M terminal, the base station detects an emergency by analyzing the content of the emergency report header, and transmits an emergency report message to notify the server of the emergency (S330). Also, the base station transmits an emergency response header to the M2M terminal (S340).

Next, the base station receives an emergency response message, which is a response to the emergency report message, from a server (S350).

Unless the M2M terminal receives an emergency response header from the base station until the elapse of a predetermined period of time after transmitting the emergency report header to the base station, it is deemed that the transmission of the emergency report header has failed. Hence, the terminal may perform the emergency report procedure again. That is, the terminal may again transmit a ranging code for an uplink bandwidth request.

Table 1 shows the format of an emergency report/response header according to an exemplary embodiment of the present invention.

TABLE 1

| Syntax | Size (bits) | Notes |
| --- | --- | --- |
| Emergency report ( ) { | | |
| FID | 4 | Flow Identifier. Set to 0b0010 |
| Type | 5 | MAC Signaling header type = 0b01000 |
| Length | 3 | Indicates the length of the signaling header in bytes |
| STID | 12 | STID of the M2M device that transmits emergency report signaling header |
| Request_Response | 1 | 0: This header is transmitted by an M2M device<br>1: This header is transmitted by BS |
| Emergency type | 3 | 0b000: Power outage<br>0b001-0b111: Reserved |
| AK_COUNT | 16 | The M2M device's current value of the AK_COUNT. |
| Reserved | 4 | Reserved. This field shall be set to 0. |
| } | | |

Referring to Table 1, the emergency report/response header includes an FID (flow ID) field, a Type field, a Length field, an STID field, a Request_Response field, an Emergency Type field, an AK_COUNT field, and a Reserved field.

The FID field is a field for identifying a wireless channel. The FID field may be predefined, for example, as 0b0010.

The Type field is a field for identifying a MAC control header.

A receiving side can detect a control header by the FID field, and detect what function the MAC control header performs by the Type field.

The Length field indicates the length of the control header. The length of the control header may be set, for example, to 6 bytes, but may vary depending on the length of a parameter contained in the emergency report/response header.

The STID field is a field for identifying a terminal. For example, the STID field identifies a terminal that is transmitting an emergency report header.

The Request_Response field indicates the type of control header. That is, Request_Response differentiates between an emergency report header and an emergency response header. For example, if the Request_Response field is set to 0, this may indicate an emergency report header the M2M terminal is transmitting to the base station, and if the Request_Response field is set to 1, this may indicate an emergency response header the base station is transmitting to the M2M terminal.

The Emergency Type field is a field for indicating the type of emergency. For example, if the value of the Emergency Type field is 0b000, this may indicate a power outage. If the emergency report header is only used to report a power outage, the Emergency Type field may not be included.

The Reserved field may be added to set the total length of a header in bytes.

The AK_COUNT field is a field used to prevent a certain terminal from transmitting an emergency report header and hindering the operation of the base station for a malicious purpose. The AK_COUNT field denotes AK_COUNT (Authentication Key_Count) that the M2M terminal is currently using for data encryption through negotiations with the base station. The base station identifies a terminal by the STID field included in the emergency report header, and determines whether the emergency report header is valid by comparing the current AK_COUNT for the terminal with the AK_COUNT included in the emergency report header. If the emergency report header is deemed to not be valid, the base station may discard this header. That is, AK_COUNT plays the role of authenticating the emergency report header.

According to an exemplary embodiment of the present invention, S120 and S130 of FIG. 1 (i.e., the procedure of transmitting a bandwidth request message to the base station from the terminal and the procedure of getting a bandwidth allocated from the base station) can be omitted. Hence, quicker reporting is made possible in the event of an emergency.

Meanwhile, if there is a bandwidth pre-allocated for uplink transmission at the time of emergency, the M2M terminal may transmit an emergency report header through the pre-allocated bandwidth, without having to transmit a ranging code for an uplink bandwidth request.

Figure 4:
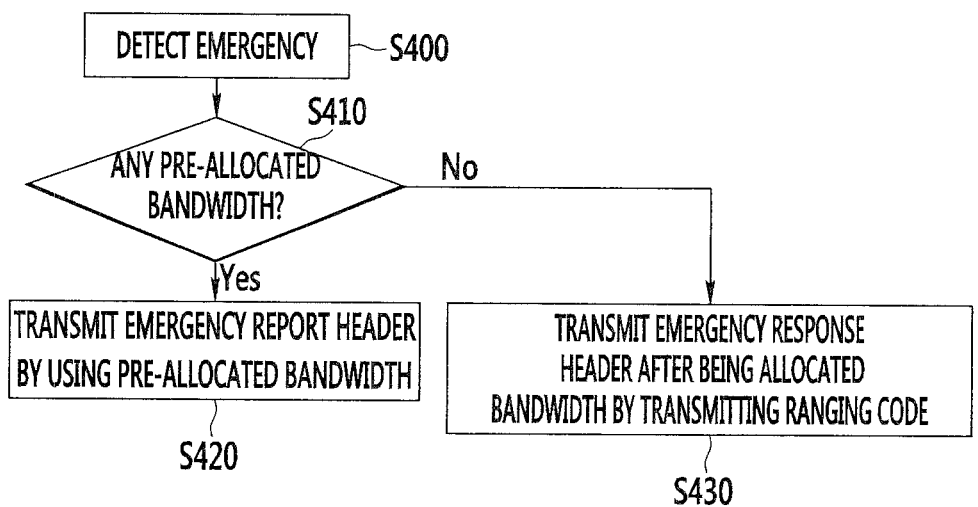
FIG. 4 is a sequential chart showing a method for transmitting an emergency report header according to an exemplary embodiment of the present invention.

FIG. 4 is a sequential chart showing a method for transmitting an emergency report header according to an exemplary embodiment of the present invention.

Referring to FIG. 4, the M2M terminal detects an emergency (S400). The emergency may be, for example, a power outage.

If there is a bandwidth pre-allocated for uplink transmission (S410), the M2M terminal transmits an emergency report header by using the pre-allocated bandwidth (S420).

If there is no bandwidth pre-allocated for uplink transmission, the M2M terminal transmits a ranging code for an uplink bandwidth request to be allocated a bandwidth, and transmits an emergency report header by using this bandwidth (S430). That is, the procedure of the steps S300 through S320 of FIG. 3 is carried out.

The length of an emergency report header according to an exemplary embodiment of the present invention does not exceed the length of a typical control header defined in IEEE 802.16p. For example, the maximum length of an emergency report header may be set to be equal to a minimum length that the base station can allocate. Accordingly, it is possible for a terminal to report an emergency through the same control header regardless of the time when an emergency takes place.

Figure 5:
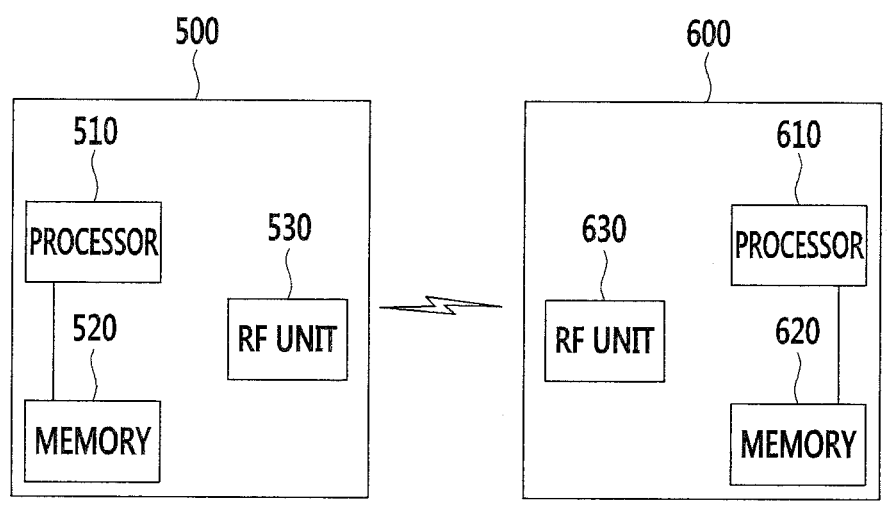
FIG. 5 illustrates a terminal and a base station which are applicable to an exemplary embodiment of the present invention.

FIG. 5 illustrates a terminal and a base station that are applicable to an exemplary embodiment of the present invention.

Referring to FIG. 5, a mobile communication system includes a terminal 500 and a base station 600. The terminal 500 and the base station 600 include processors 510 and 610, memories 520 and 620, and RF (radio frequency) units 530 and 630, respectively. The processors 510 and 610 may be configured to implement the procedures and/or methods proposed in the present invention. The memories 520 and 620 are respectively connected to the processors 510 and 610, and store various information related to the operations of the processors 510 and 610. The RF units 530 and 630 are respectively connected to the processors 510 and 610, and send and/or receive radio signals. The base station 600 and/or the terminal 500 may have a single antenna or multiple antennas.

In this specification, although the description has been made with respect to an M2M terminal, this is merely an embodiment of the present invention. That is, the same applies to a non-M2M terminal.

For better comprehension and ease of description, the description has been made of an example where the emergency is a power outage, but it is not limited thereto. An exemplary embodiment of the present invention can be applied to various emergencies that may occur to a terminal, as well as to a power outage.

According to an exemplary embodiment of the present invention, the procedure for a terminal to report an emergency can be reduced such that quick reporting is made possible. Moreover, the complexity of implementation can be decreased by reporting an emergency through the same control header regardless of the time when an emergency takes place. In addition, a bandwidth for reporting an emergency can be allocated first before a bandwidth for typical uplink transmission. Further, it is also possible to report an emergency by using a bandwidth that is pre-allocated for typical uplink transmission.

The exemplary embodiments of the present invention may also be implemented by a program realizing functions corresponding to the construction of the embodiment, and a recording medium on which the program is recorded, other than the device and/or method described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to report an emergency in a mobile communication system, the method comprising:

detecting an emergency; and transmitting an emergency report header to a base station to notify the emergency without establishing a radio connection for an emergency call between the terminal and the base station, the emergency report header comprising a field indicating a signaling header for emergency reporting.

2. The method of claim 1, wherein the emergency report header further comprises at least one of a field identifying a wireless channel, a field for indicating a length of the emergency report header, a field for identifying a terminal, a field for indicating a type of emergency, and a field for authenticating the emergency report header.

3. The method of claim 2, wherein the field for authenticating the emergency report header comprises a value of AK_COUNT (Authentication Key_Count) that the terminal is currently using for encryption through negotiations with the base station.

4. The method of claim 1, wherein the field is 5 bits long.

5. The method of claim 1, wherein the emergency is a power outage.

6. The method of claim 1, further comprising receiving an emergency response header, which is a response to the emergency report header, from the base station, the emergency response header comprising a field for indicating a signaling header for emergency response.

7. The method of claim 6, wherein the emergency response header further comprises at least one of a field for identifying a wireless channel and a field for indicating the length of the emergency response header.

8. The method of claim 1, further comprising transmitting a ranging code for an uplink bandwidth request to the base station, wherein the emergency report header is transmitted through an uplink bandwidth allocated from the base station by the ranging code.

9. The method of claim 1, wherein the emergency report header is transmitted through an uplink bandwidth allocated to the terminal.

10. The method of claim 1, wherein the emergency report header is 6 bytes long at a maximum.

11. A method for a terminal to report an emergency in a mobile communication system, the method comprising:

detecting the emergency; and transmitting an emergency report header to a base station as notification of the emergency, wherein the emergency report header comprises a field with a signaling header indicating emergency reporting, wherein, unless an emergency response header is received from the base station within a predetermined period of time after transmitting the emergency report header, reporting of the emergency is carried out again.

12. A terminal comprising:

an RF (radio frequency) unit and a processor, wherein the processor is configured to:
   detect an emergency and
   transmit an emergency report header to a base station to notify the base station of the emergency without establishing a radio connection for an emergency call between the terminal and the base station, wherein the emergency report header comprising a field that indicates a signaling header for emergency reporting.

13. The terminal of claim 12, wherein the emergency report header is transmitted through an uplink bandwidth allocated by transmitting a ranging code.

14. The terminal of claim 12, wherein the emergency report header is transmitted through an uplink bandwidth pre-allocated from the base station.

15. The terminal of claim 12, being configured to receive an emergency response header from the base station within a predetermined period of time after transmitting the emergency report header.

* * * * *